United States Patent
Drinkard et al.

(10) Patent No.: US 9,926,206 B2
(45) Date of Patent: Mar. 27, 2018

(54) TREATMENT OF MANGANESE-CONTAINING MATERIALS

(71) Applicants: William F. Drinkard, Charlotte, NC (US); Hans J. Woerner, Mt. Pleasant, NC (US); William M. Nixon, Charlotte, NC (US)

(72) Inventors: William F. Drinkard, Charlotte, NC (US); Hans J. Woerner, Mt. Pleasant, NC (US); William M. Nixon, Charlotte, NC (US)

(73) Assignee: DEEPGREEN ENGINEERING, PTE. LTD., Singapore (SG)

( * ) Notice: Subject to any disclaimer, the term of this patent is extended or adjusted under 35 U.S.C. 154(b) by 0 days.

(21) Appl. No.: 14/313,945

(22) Filed: Jun. 24, 2014

(65) Prior Publication Data
US 2015/0368120 A1 Dec. 24, 2015
US 2016/0280561 A9 Sep. 29, 2016

Related U.S. Application Data

(63) Continuation of application No. PCT/US2013/023777, filed on Jan. 30, 2013.

(60) Provisional application No. 61/593,107, filed on Jan. 31, 2012, provisional application No. 61/681,193, filed on Aug. 9, 2012.

(51) Int. Cl.
*C01G 45/08* (2006.01)
*C22B 47/00* (2006.01)
*C01G 45/02* (2006.01)

(52) U.S. Cl.
CPC ............ *C01G 45/08* (2013.01); *C01G 45/02* (2013.01); *C22B 47/0063* (2013.01)

(58) Field of Classification Search
None
See application file for complete search history.

(56) References Cited

U.S. PATENT DOCUMENTS

| | | | | |
|---|---|---|---|---|
| 2,890,103 A * | 6/1959 | Daugherty | ...................... | 423/51 |
| 3,780,159 A * | 12/1973 | Welsh | .............................. | 423/49 |
| 4,123,499 A * | 10/1978 | Welsh et al. | .................... | 423/35 |
| 2005/0103163 A1* | 5/2005 | Ward | .............................. | 75/743 |

FOREIGN PATENT DOCUMENTS

| | | | | | |
|---|---|---|---|---|---|
| DE | 2733727 A1 * | 2/1979 | | .............. | C22B 3/06 |
| EP | 0272060 A2 * | 6/1988 | | .............. | C22B 3/08 |
| JP | 61235520 A * | 10/1986 | | | |
| WO | WO 03029148 A2 * | 4/2003 | | ......... | C01G 45/1235 |

* cited by examiner

*Primary Examiner* — Melissa S Swain
(74) *Attorney, Agent, or Firm* — Ralph H. Dougherty

(57) ABSTRACT

An improved method for treating manganese-containing materials, such as seafloor manganese nodules, by leaching with aqueous $HNO_3$ and NO gas, and more particularly to methods for recovering valuable constituents from such nodules, especially manganese, cobalt, nickel, iron, and copper. It also provides a method to leach manganese material to release the titanium, vanadium, cerium, molybdenum and other metals from the manganese oxides and to make them available to be recovered.

20 Claims, 2 Drawing Sheets

TREATMENT OF MANGANESE-CONTAINING MATERIALS

CROSS REFERENCE TO RELATED APPLICATIONS

This application claims the benefit of priority of PCT Application PCT/US13/23777, filed Jan. 30, 2013, and U.S. Provisional Patent Application Ser. No. 61/593,107, filed Jan. 31, 2012, and 61/681,193, filed Aug. 9, 2012.

FIELD OF THE INVENTION

The present invention relates to a method for treating manganese-dioxide-containing materials. The invention is well suited to treating manganese-containing nodules recovered from the seafloor or lake floor, as well as manganese ores. The invention relates particularly to methods for leaching and recovering valuable constituents from such materials, especially manganese, and, if present, cobalt, nickel, copper, iron, and other valuable metals.

BACKGROUND OF THE INVENTION

Manganese-containing material treated by the invention can include manganese dioxide minerals in any form, including ores, or nodules, such as deep sea nodules.

Polymetallic or manganese nodules, are concretions formed of concentric layers of iron and manganese oxides around a core.

Deep sea nodules on the ocean floor include in their composition at least manganese (Mn) and usually nickel, cobalt, copper, zinc, and iron, with small amounts of titanium, vanadium, molybdenum, and cerium. Often present in addition are one or more of the following metals: magnesium, aluminum, calcium, cadmium, potassium, sodium, zirconium, titanium, lead, phosphorus, and barium.

All of the desired valuable metals in manganese nodules are tied up with insoluble oxidized manganese, such as $MnO_2$. Only about 5% of the manganese contained in the nodules is acid soluble. Thus it is necessary to reduce the $MnO_2$ by a suitable reducing agent as a first step in order to recover the metal constituents. Historically, $SO_2$ has been used for this purpose. For deep sea nodules, carbon monoxide has also been used. However such prior art processes often do not recover a suitable manganese product, are capable of recovering only from about 80 to about 92% of the primary metal values, and often produce large quantities of waste. Moreover, a sulfate system requires large sized equipment with attendant high capital cost.

Unexpectedly, and contrary to earlier teachings, it has been found that reacting manganese-dioxide-containing materials with nitric oxide in the presence of nitric acid in aqueous solution results in recovery of at least 99% of the manganese values and associated metals (known as "pay metals" because they have higher commercial value than manganese).

SUMMARY OF THE INVENTION

The present invention is a process for recovering manganese and, if present; other metal values from manganese-dioxide containing material, including deep sea manganese nodules, by treating manganese-dioxide containing material with nitric oxide (NO) in an aqueous nitric acid solution. The net reaction with the $MnO_2$ is as follows:

$$3MnO_2 + 2NO + 4HNO_3 \rightarrow 3Mn(NO)+2H_2O$$

liberating the trapped desired valuable metals. In the present process, the quantity of NO required per unit of manganese recovered is less than one-third of the quantity of $SO_2$ required per unit of manganese, or the quantity $NO_2$ required per unit of manganese. Thus, the invented process delivers substantial savings in reactant costs and by product disposal.

OBJECTS OF THE INVENTION

The principal object of the present invention is to provide an improved method of recovering manganese from manganese-dioxide bearing materials.

Another object of the invention is to provide an effective leach for recovering metal values from manganese-bearing materials, including, if present, nickel, cobalt, zinc, copper, magnesium, aluminum, iron, cadmium, zirconium, titanium, lead, cerium, molybdenum, phosphorus, barium, and vanadium.

Another object of the invention is to provide an effective method of recovering metal values from undersea manganese-containing materials including deep sea manganese nodules.

Another object of the invention is to produce fertilizer grade nitrate materials.

BRIEF DESCRIPTION OF THE DRAWINGS

The foregoing and other objects will become more readily apparent by referring to the following detailed description and the appended drawings, in which.

DETAILED DESCRIPTION

Figure 1:
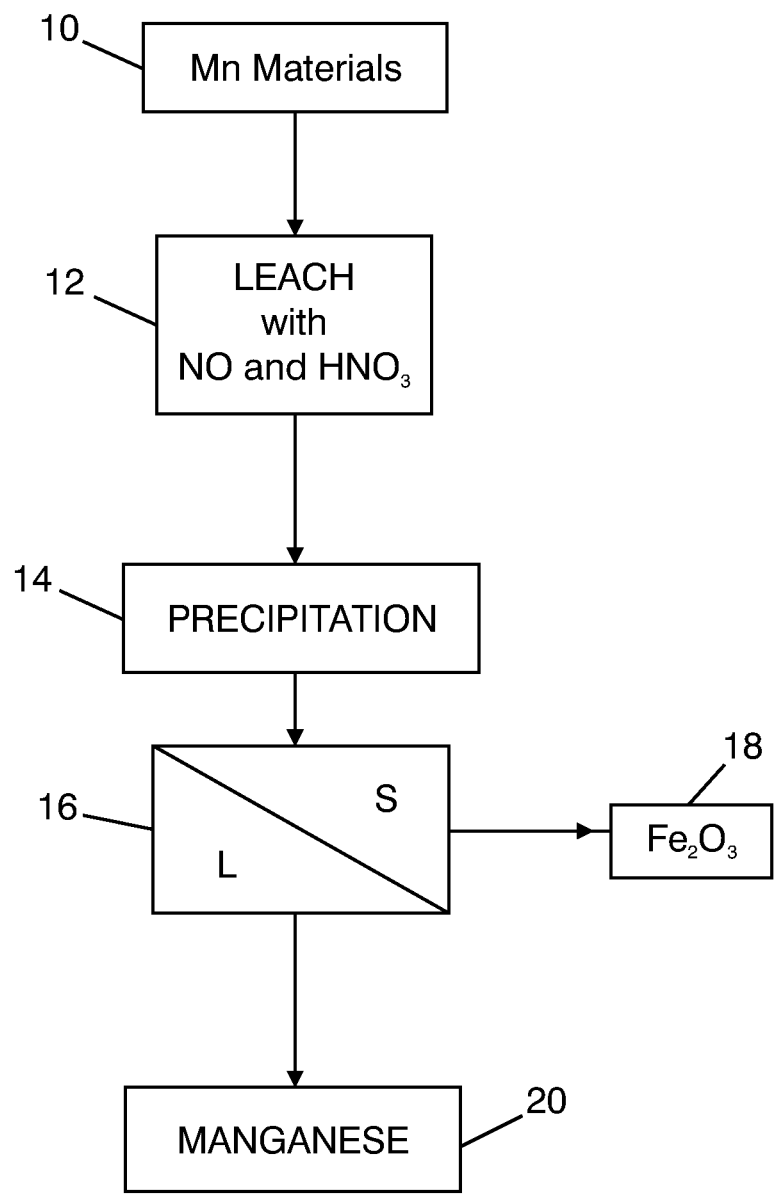
FIG. 1 is a schematic flow sheet of the invented process.

Referring now to FIG. 1; the invented method of recovering manganese from materials 10 containing manganese-dioxide ($MnO_2$) and other metal values, comprises the steps of:

a. leaching 12 the manganese-dioxide containing materials with NO gas in an aqueous solution of $HNO_3$ (nitric acid) to form MnO which dissolves in the nitric acid, releases the accompanying metals into solution, and leaves an acid-insoluble, essentially metal-free residue;

b. precipitating 14 iron from the solution as a residue;

c. separating 16 the iron-containing residue 18 from the solution; and d. precipitating and recovering manganese 20 from the solution.

The process begins with manganese-dioxide containing material, such as deep sea manganese nodules, which may be obtained from an ocean, sea, or other body of water. Sometimes such nodules are found in large lakes. The deep sea modules often contain in excess of 20 percent manganese, usually about 30 percent.

In addition to manganese, such deep sea nodules usually contain at least one of the following metals: nickel, cobalt, zinc, copper, magnesium, aluminum, iron, calcium, cadmium, potassium, sodium, zirconium, titanium, lead, cerium, molybdenum, phosphorus, barium, and vanadium. The invented process includes the efficient leaching and recovery of many of these metal values.

Optionally, the nodules are crushed or ground to increase the surface area for leaching. Advantageously, any chlorides in the nodules, such as from salt water, are removed by any convenient method, such as washing. This step may be done before, during or after any crushing but preferably after. Crushing or grinding the nodules can occur during leaching in a wet mill or wet crusher.

Preferably, the modules are leached in an aqueous nitric acid solution into which NO gas is introduced as the reactant. Alternatively, the NO gas first may be introduced into an aqueous $HNO_3$ solution, followed by the introduction of nodules into the solution to complete the reaction.

The NO reacts with $MnO_2$ to form MnO and $NO_2$, and to release the other metals from the nodules. The MnO so produced dissolves in the nitric acid, leaving an acid-insoluble residue, which may be removed from the solution at that time, or the acid-insoluble residue may be carried forward to the iron-precipitation step and removed with the iron, as desired. The temperature of the solution is preferably controlled to a temperature in the range of 30 to 120° C. to achieve the reaction.

The pH of the solution is then changed to about 0.5-2.5 to precipitate hydrated iron oxide. The precipitated iron values are removed by solid-liquid separation techniques. This pH change may be achieved in various ways, including the addition to the solution of a precipitating agent, such as alkalis, alkaline earths, ammonia, or other acid-reducing agents. Alternatively, such precipitation can be effected by any other method of achieving iron hydrolysis and its precipitation, ensuring the separation of iron from the more valuable metals.

Once in solution, the metal values may be precipitated as oxides or sulfides. Any copper, lead, cadmium, and zinc present in the solution is removed therefrom. Preferably, the solution is adjusted to a low pH, preferably less than 3, and a heavy-metal precipitating agent, such as a sulfide or an organic reagent or a complexing agent, is introduced into the solution to precipitate any copper, lead, cadmium, and zinc which is present in the solution, and the precipitated metal values are removed by solid-liquid separation.

The pH of the solution is raised, and, if desired, a sulfide is added to the solution to precipitate cobalt and nickel as sulfides. Remaining aluminum and some remaining zinc may also be precipitated as sulfides in this step.

Preferably, the pH of the solution is then raised to a pH in the range of about 8 to 10 to precipitate manganese. After separating the manganese residue, the remaining solution is a fertilizer grade nitrate product. Alternatively, the manganese nitrate in the solution can be decomposed to recover manganese oxide and nitrogen dioxide, the latter of which can be readily converted to nitric acid.

Figure 2:
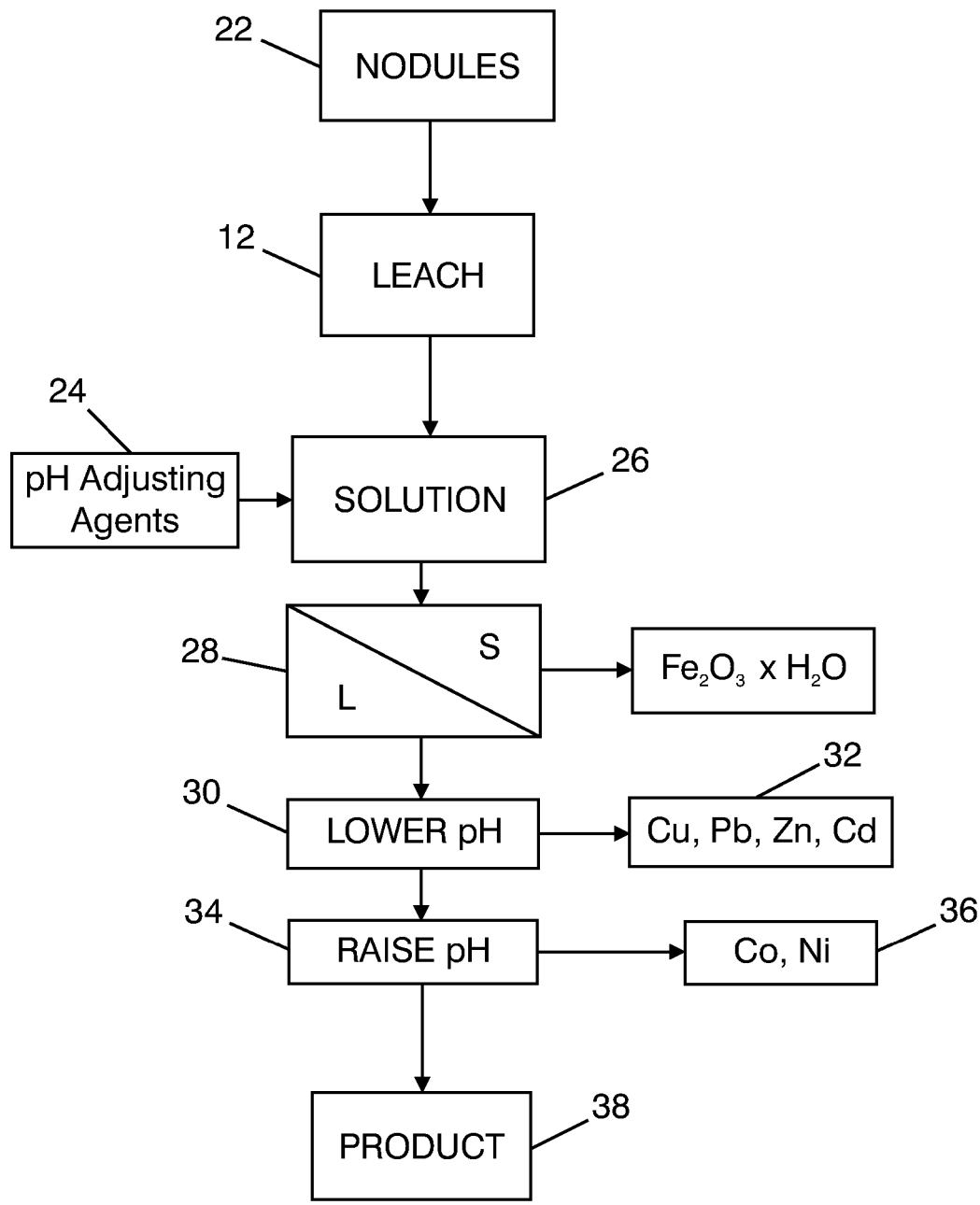
FIG. 2 is a schematic flow sheet of a more detailed process to the process depicted in FIG. 1.

Referring now to FIG. 2 which depicts an embodiment of the present invention in greater detail than FIG. 1, the method of recovering metal values from deep-sea manganese nodules, comprises the steps of:

a. obtaining manganese-dioxide containing nodules 22 which also contain at least one of the metals of the group consisting of: cobalt, nickel, lead, copper, magnesium, aluminum, iron, cadmium, zirconium, titanium, zinc, cerium, molybdenum, phosphorus, barium, and vanadium;

b. leaching the nodules at 12, with NO gas in an aqueous solution of $HNO_3$ to form manganese nitrate in solution and to release the other metals into solution;

c. adding pH adjusting agents 24 to the solution 26 to precipitate ferric hydroxide;

d. separating 28 the precipitated ferric hydroxide from the solution;

e. adjusting 30 the solution to a low pH and introducing a sulfide to the solution to precipitate copper, lead, cadmium, and zinc 32, if present in the solution.

f. raising 34 the pH of the solution and introducing additional sulfide to precipitate cobalt and nickel sulfides 36; and g. raising the solution pH to about 8 to 10 to precipitate hydrated manganese oxide ($H_2MnO_2$) product.

SUMMARY OF THE ACHIEVEMENT OF THE OBJECTS OF THE INVENTION

From the foregoing, it is readily apparent that we have invented an improved method for treating manganese-containing material including the treatment of seafloor manganese nodules recovered by undersea mining to effectively leach the material to produce a manganese oxide product and release any valuable metals by reducing manganese dioxide with nitric oxide, and for recovering the metal values contained in the nodules more efficiently and more economically than heretofore has been possible. We have also invented an improved method of recovering manganese from manganese-bearing materials, including an effective leach for recovering metal values from manganese-bearing materials, including, if present, nickel, cobalt, copper, magnesium, aluminum, iron, cadmium, zirconium, titanium, zinc, lead, cerium, molybdenum, phosphorus, barium, and vanadium; as well as an effective method of recovering metal values from undersea manganese-containing materials including deep sea manganese nodules, and for producing a fertilizer grade nitrate material.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is defined by the appended claims.

What is claimed is:

1. A method of recovering manganese from materials containing manganese-dioxide (MnO2) and other metal values, comprising the following steps:

a. leaching the manganese-dioxide containing materials by introducing nitric oxide gas as reducing agent into an aqueous solution of nitric acid to obtain a manganese compound consisting essentially of MnO which is soluble in the aqueous solution of nitric acid, dissolves in the nitric acid, and releases the other metal values into the aqueous solution, and leaving an acid-insoluble residue;

b. precipitating iron from the aqueous solution as an iron-containing residue;

c. separating the iron-containing residue from the aqueous solution; and d. precipitating and recovering manganese as manganese oxide from the aqueous solution.

2. A method according to claim 1 wherein the manganese-dioxide containing materials are leached in an aqueous nitric acid solution into which nitric oxide gas is then introduced.

3. A method according to claim 1 wherein the manganese-dioxide containing material contains at least one of the metals of the group consisting of: nickel, cobalt, copper, magnesium, aluminum, iron, calcium, cadmium, potassium, sodium, zirconium, titanium, zinc, lead, cerium, molybdenum, phosphorus, barium, and vanadium.

4. A method according to claim 1 wherein the manganese-dioxide containing materials are manganese nodules obtained from any body of water, including a seafloor or lake floor.

5. A method according to claim 4, further comprising removing chlorides from the nodules prior to leaching.

6. A method according to claim 1 wherein the manganese-dioxide containing materials are ores.

7. A method according to claim 4, further comprising crushing or grinding the nodules prior to leaching.

8. A method according to claim 4, further comprising crushing or grinding the nodules during leaching in a wet mill or wet crusher.

9. A method according to claim 5, wherein the chlorides are removed by washing the materials.

10. A method according to claim 9, wherein the chlorides are removed by washing the materials prior to leaching while crushing or grinding the nodules in a wet mill or wet crusher.

11. A method according to claim 1, further comprising removing the acid-insoluble residue prior to precipitating the iron as an iron-containing residue.

12. A method according to claim 1 wherein following teaching, the pH of the leachant is changed to about 0.5-2.5 to precipitate hydrated iron oxide.

13. A method according to claim 12 wherein the pH of the leachant is changed by the addition to the aqueous solution of pH adjusting agents.

14. A method according to claim 13 wherein the pH adjusting agents are selected from the group consisting of alkalis, alkaline earths, or ammonia.

15. A method according to claim 12 wherein the precipitated, hydrated iron oxide is removed from the aqueous solution by solid-liquid separation.

16. A method according to claim 1 where any, copper, lead, cadmium, and any zinc present in the aqueous solution are removed by precipitation at a low pH of less than 3.0, followed by solid-liquid separation.

17. A method according to claim 16 where precipitation is effected by adjusting the aqueous solution to a pH of less than 3.0, then introducing a sulfide into the solution to precipitate as sulfides any copper, lead, cadmium, and zinc which is present in the aqueous solution, and the precipitated metal values are removed by solid-liquid separation.

18. A method according to claim 1, further comprising raising the pH of the aqueous solution precipitating and removing any cobalt or nickel.

19. A method according to claim 18, wherein precipitation of cobalt and nickel is carried out by raising the pH of the aqueous solution and introducing additional sulfide thereto, and forming cobalt and nickel sulfides in solid form.

20. A method according to claim 1, wherein precipitation of manganese is carried out by raising the aqueous solution pH to about 8 to 10.

* * * * *